(12) United States Patent
Kim

(10) Patent No.: US 8,960,039 B2
(45) Date of Patent: Feb. 24, 2015

(54) AUTO TRANSMISSION LEVER MOUSE DEVICE FOR SHIFT BY WIRE SYSTEM

(75) Inventor: Eunsik Kim, Daegu (KR)

(73) Assignee: Hyundai Motor Company, Seoul (KR)

( * ) Notice: Subject to any disclaimer, the term of this patent is extended or adjusted under 35 U.S.C. 154(b) by 776 days.

(21) Appl. No.: 13/180,299

(22) Filed: Jul. 11, 2011

(65) Prior Publication Data

US 2012/0006139 A1     Jan. 12, 2012

(30) Foreign Application Priority Data

Jul. 12, 2010    (KR) ........................ 10-2010-0066958

(51) Int. Cl.
| | | |
|---|---|---|
| B60K 17/04 | (2006.01) | |
| B60K 17/12 | (2006.01) | |
| F16H 59/08 | (2006.01) | |
| F16H 59/02 | (2006.01) | |

(52) U.S. Cl.
CPC ............ *F16H 59/08* (2013.01); *F16H 59/0217* (2013.01)
USPC ........ 74/473.12; 345/163; 74/473.3; 180/333

(58) Field of Classification Search
USPC .................. 74/473.1, 473.3–473.35, 473.12; 341/20, 22; 345/163, 168, 184; 463/37, 463/38; 180/333, 336
See application file for complete search history.

(56) References Cited

U.S. PATENT DOCUMENTS

| | | | | |
|---|---|---|---|---|
| 5,699,600 | A  * | 12/1997 | Choi ................................ | 29/251 |
| 6,011,543 | A  * | 1/2000  | Tian ................................ | 345/163 |
| 6,636,197 | B1 * | 10/2003 | Goldenberg et al. ......... | 345/156 |
| 2002/0152827 | A1 * | 10/2002 | Hayashi et al. .............. | 74/473.3 |
| 2006/0038786 | A1 * | 2/2006  | Adan et al. .................... | 345/163 |
| 2007/0035517 | A1 * | 2/2007  | Chen et al. .................... | 345/163 |
| 2007/0132733 | A1 * | 6/2007  | Ram .............................. | 345/163 |
| 2007/0188455 | A1 * | 8/2007  | O'Connell et al. ........... | 345/163 |
| 2008/0010616 | A1 * | 1/2008  | Algreatly ...................... | 715/856 |
| 2009/0146954 | A1 * | 6/2009  | Regen et al. .................. | 345/163 |
| 2009/0207136 | A1 * | 8/2009  | Farag et al. ................... | 345/163 |
| 2010/0043585 | A1 * | 2/2010  | Kim ............................ | 74/473.11 |
| 2010/0315342 | A1 * | 12/2010 | Akatsuka ...................... | 345/163 |

FOREIGN PATENT DOCUMENTS

| | | |
|---|---|---|
| JP | 5-229360 A | 9/1993 |
| JP | 10-16594 A | 1/1998 |
| JP | 2002-254950 A | 9/2002 |
| JP | 2008-49793 A | 3/2008 |
| JP | 2008-223865 A | 9/2008 |
| KR | 10-2010-0090826 A | 8/2010 |

* cited by examiner

*Primary Examiner* — Justin Krause
*Assistant Examiner* — Alexander Vu
(74) *Attorney, Agent, or Firm* — Morgan, Lewis & Bockius LLP

(57) ABSTRACT

A mouse AT lever includes a pair of A/B buttons generating control signals when being pressed and an operation dial turning to implement P, R, N, D, and M shift ranges, and can implement a basic function of outputting operation signals for the positions of the selected shift ranges and implementing operation feeling according to the shifting in various ways using the pressing time of A/B buttons, a function of preventing mis-operation in the shifting by using H-MATIC functions, a shift-lock function that prevents the ranges from being switched under a predetermined condition, a function of starting the engine by using a button, a customer-directional safety control function that is set by the customer, and an interface function for communicating with an DIS (Driver Information System) controlling the devices mounted in the vehicle.

16 Claims, 6 Drawing Sheets

AUTO TRANSMISSION LEVER MOUSE DEVICE FOR SHIFT BY WIRE SYSTEM

CROSS-REFERENCE TO RELATED APPLICATIONS

The present application claims priority to Korean Patent Application Number 10-2010-0066958 filed Jul. 12, 2010, the entire contents of which application is incorporated herein for all purposes by this reference.

BACKGROUND OF INVENTION

1. Field of Invention

The present invention relates to a shift by wire system, particularly an AT (Auto Transmission) lever mouse device that can be more conveniently operated and implement complicated functions in various ways.

2. Description of Related Art

In general, an AT lever of a shift by wire system is largely divided into a lever type, a dial type, and a column type.

FIG. 1A is an example of a lever type (1) of AT lever, FIG. 1B is an example of a dial type (2) of AT lever, and FIG. 1C is an example of a column type (3) of AT lever.

The various lever types improve operation feeling by operation distance (stroke) that is shorter than mechanical AT levers of the related art, but are very inconvenient in terms of an ergonomic motion operation trace.

For example, the entire arm is necessarily moved to operate the lever type 1 and the column type 3, and it is required bend and turn the wrist to operate the lever type 2.

When shifting the gear by using H-MATIC (Hyundai-Automatic) functions, it is required to strengthen safety of preventing mis-operation of the lever, and accordingly, a + button and a − button are applied.

It is easy to apply the + button and − button in lever type 1 and safety can be strengthened when shifting the gear by using the H-MATIC functions, but dial type 2 or column type 3 has a structural limit that the + button and − button cannot be applied.

Therefore, there is a disadvantage that it is impossible to implement shifting by using the H-MATIC functions in dial type 2 or column type 3.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an AT lever mouse device for a shift by wire system that can considerably reduce a motion operation trace of a human body by making it possible to press a button only with a finger and turn a dial, with the button held with the hand, and can implement multi-tasking by operating a + button and a − button in various ways which are provided to strength safety when shifting the gear by using an H-MATIC functions.

Various aspects of the present invention provide for an AT lever mouse device for a shift by wire system, including a mouse shaped to be operable by fingers while being held by a hand, a pair of A-button and B-button disposed at the mouse and generating and transmitting to an ECU operation signals generated when being pressed by fingers, and a shifting operation unit disposed at the mouse and transmitting to the ECU shift range position signals generated when being turned by fingers.

The AT lever mouse device for a shift by wire system further includes a display that displays the shifted states of the shift ranges on the mouse.

The mouse includes a knob housing having a shape similar to a computer mouse, with an empty internal space and an open bottom, and a base plate shaped in a flat plate and coupled to the open bottom of the knob housing.

The knob housing has a side opening formed by cutting off a portion of the frame forming one side of the knob housing such that a portion of the shifting operation unit is exposed to be operated by a finger, and a button seat formed by cutting off a portion of the frame from the top to the front of the knob housing such that the pair of A-button and B-button, which are pressed with fingers, are seated.

The pair of A-button and B-button generate different operation signals, which is recognized by the ECU, in accordance with the degree of pressing such that various control logics of the ECU is selectively executed.

The pair of A-button and B-button each include a button body, which has a slot fitted on the guider protruding in the internal space of the knob housing of the mouse at one side, a spring elastically supporting the button body, and a switch generating the operation signal by contacting with the button body.

The shifting operation unit includes an operation dial for determining selected positions of the shift ranges in the shift ranges implemented at turning angles made about a hinge pipe, a solenoid restricting the rotation of the operation dial, an operation feeling generator transmitting operation feeling from the shift ranges switched by the rotation of the operation dial, and a shift range detector generating position signals about the information on the selected shift ranges by the rotation of the operation dial.

A solenoid shaft of the solenoid is fitted in a position hole bored coaxially with a shaft hole for fitting the hinge shaft in the operation dial and the number of position holes is not the same as the number of shift ranges implemented by rotation of the operation dial.

The operation feeling generator has a groove coaxially fainted with the shaft hole for fitting the hinge pipe in the operation dial, and a bullet elastically supported by a bullet spring and keeping in contact with the surface of the groove.

The groove has a trace made by repetitive smooth conical curves when expanding straight from 0° to 360°, and when the distance between the start point and the end point of one smooth conical curve is one pitch, the one pitch is defined as the distance between the adjacent shift ranges.

The bullet has a spherical end that is in contact with the groove and is accommodated in a hollow case fixed to the base plate of the mouse and elastically supported by the bullet spring.

The shift range detector includes at least one or more magnets disposed at the operation dial and rotating with the operation dial, and a sensor circuit board detecting different magnitude of magnetic force from the magnets by a phase difference due to rotation of the magnets, and transmitting signals according to the magnitude of the detected magnetic force to the ECU.

The magnets are two magnets disposed inside the coaxial circle defined by the position holes of the operation dial and arranged at 180° from each other.

Other aspects of the present invention provide for an AT lever mouse device for a shift by wire system, including a shifting operation unit that is disposed at a side of a mouse shaped to be held by a hand, and transmits shift range position signals generated when being turned by fingers to an ECU, and a pair of A-button and B-button that is disposed at the front of the mouse, and generates different operation signals such that additional control logics, other than a shift range control logic of the ECU, are selected, in accordance with the time for which the A-button and the B-button are pressed by fingers.

The additional control logics of the ECU are a function of starting an engine, a customer-directional safety control function defined by a customer, and an interface function for communication with a DIS (Driver Information System) controlling devices mounted in a vehicle.

The function of starting an engine is selected by an operation signal generated when the pair of A-button and B-button are simultaneously pressed, the customer-directional safety control function is selected by an operation signal generated when the A-button or the B-button is individually pressed or an operation signal generated when the pair of A-button and the B-button are simultaneously pressed, and the interface function is selected by an operation signal generated when the pair of A-button and the B-button are simultaneously pressed.

The AT lever mouse device of the present invention has a mouse shape, such that it is possible to improve grip feeling in operation and reduce fatigue of the driver by minimizing the motion trace of the human body.

Further, the AT lever mouse device of the present invention makes it possible to reduce the cost and conveniently start the engine, as compared with using a specific engine start button, because it is possible to start the engine by using a + button and a − button that are provided to strengthen safety in shifting by using H-MATIC functions, without using a specific engine start button.

In addition, the AT lever mouse device of the present invention makes it possible to combine various control logics that can be tuned by the + button and the − button, such that it is possible to implement various convenient control methods, in addition to shift-lock, and considerably improve control safety.

Moreover, the AT lever mouse device of the present invention makes it possible to communicate with a DIS (Driver Information System) controlling various devices in a vehicle, using the + button and the − button at the P-range and the N-range where the vehicle safely stops, and provide convenience of executing a menu provided by a device that is in a communication state by using a dial for selecting the shift ranges.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
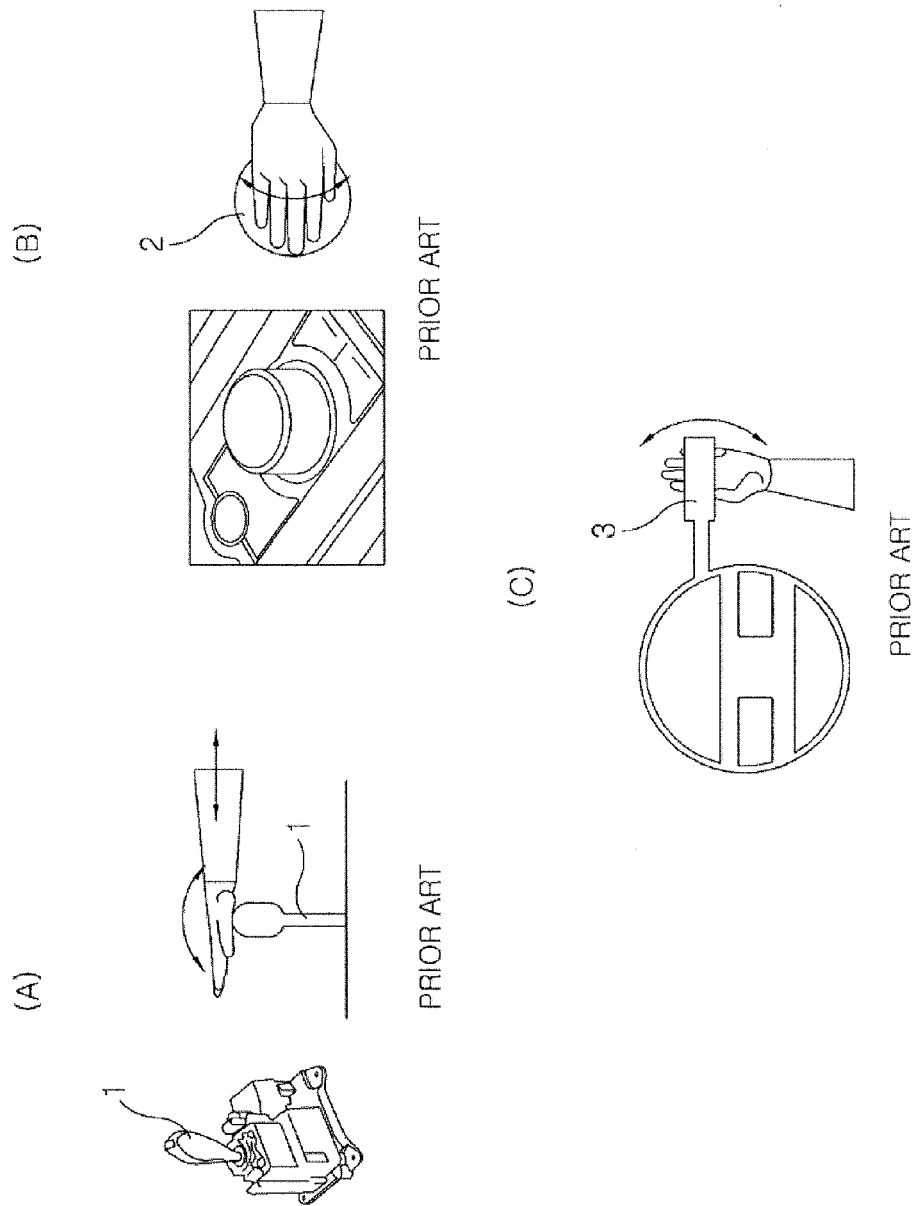
FIGS. 1A to 1C are views showing the configuration of an AT lever of a shift by wire system according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
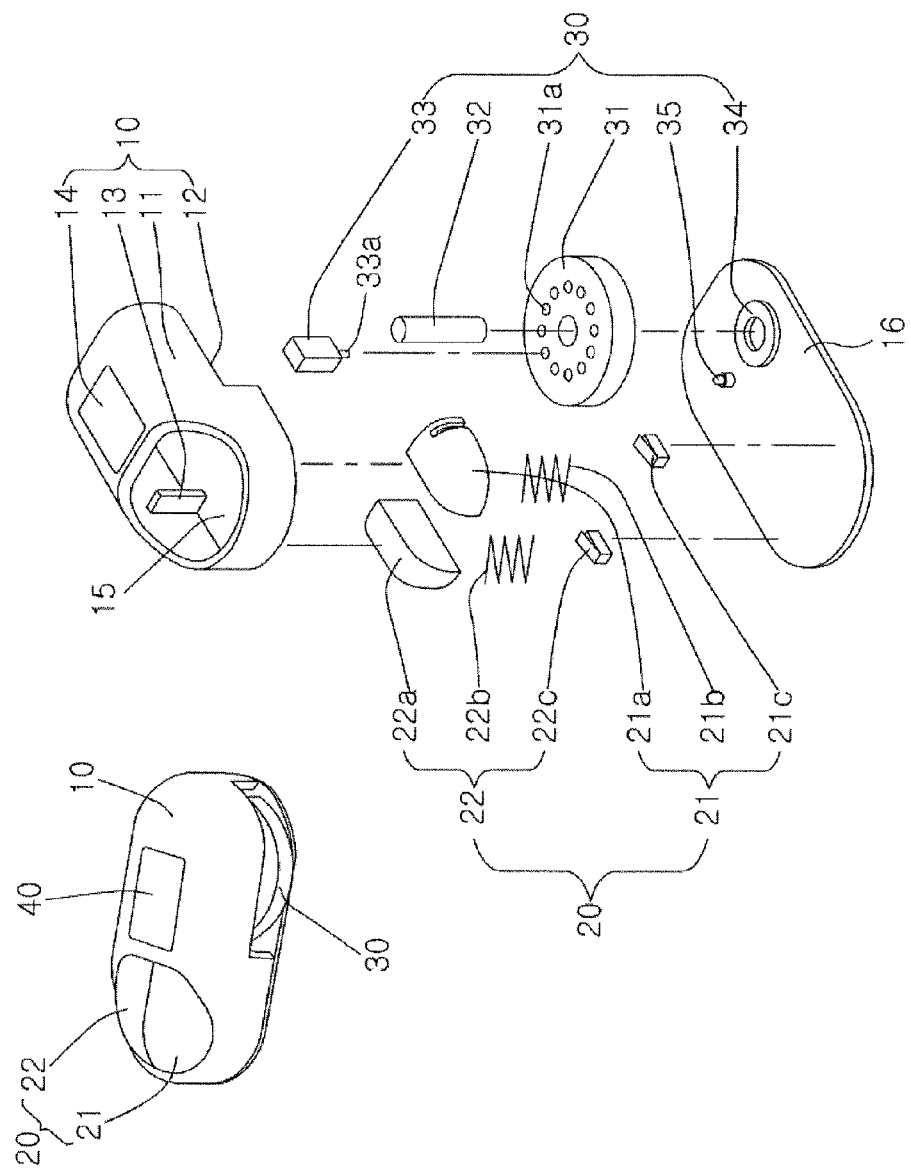
FIG. 2 is a view showing the configuration of an AT lever mouse device for an exemplary shift by wire system according to the present invention.

Referring to FIG. 2, the AT lever mouse device includes a mouse 10 that is formed in a shape of a computer mouse for a computer to be operated by fingers while being held in a hand, a button unit 20 that is disposed at the front portion of mouse 10 and generates operation signals, a shifting operation unit 30 that is disposed at a side of mouse 10 and generates selected shift range (P, R, N, D, and M) signals, and a display 40 that is disposed on the top of mouse 10 and displays selected shift ranges.

Mouse 10 includes a knob housing 11 that can be held with a hand, such as a computer mouse, and has an empty internal space and a bottom that is open, and a base plate 16 that is shaped in a flat plate and coupled to the open bottom of knob housing 11.

Knob housing 11 and base plate 16 are coupled in various ways, such as using a groove and a protrusion that is fitted in the groove, screws, or an adhesive.

Knob housing 11 has a side opening 12 that is formed by cutting off a portion of the frame forming one side of knob housing 11, a guider 13 that protrudes from the inner wall of knob housing 11 toward the internal space, a window 14 that is formed by cutting off a portion of the frame forming the top of knob housing 11, and a button seat 15 that is formed by cutting off a portion of the frame formed from the top to the front of knob housing 11.

Figure 3:
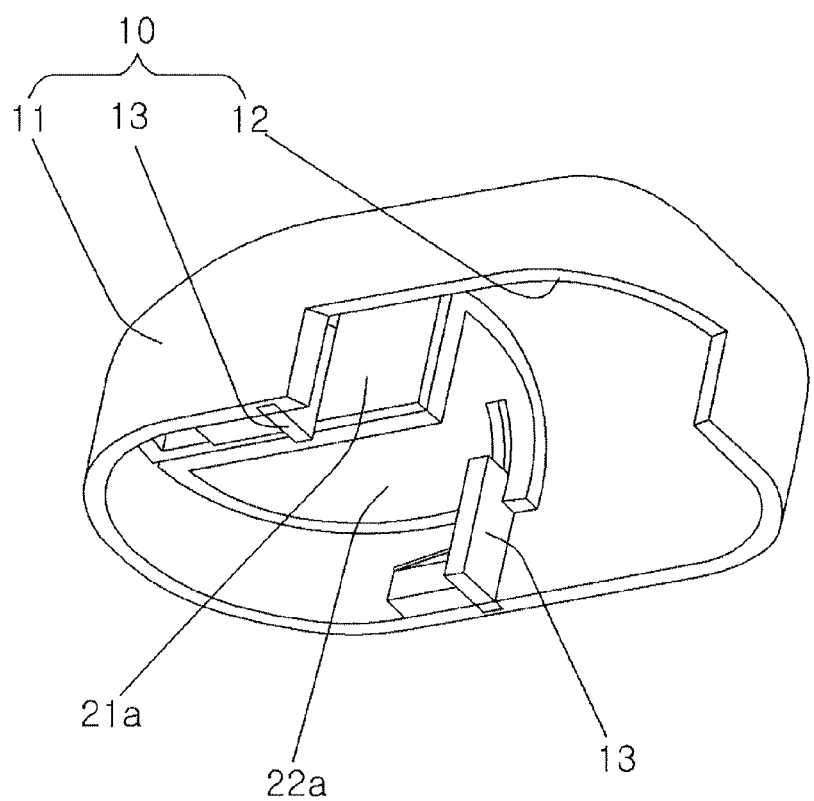
FIGS. 3 to 5 are view showing the configurations of the parts in the exemplary AT lever mouse device according to the present invention.

As shown in FIG. 3, guider 13 is formed in a rectangle with a small thickness and disposed inside the space of button seat 15.

Button unit 20 includes a pair of A-button 21 and a B-button 22 that generate operation signals when softly pressed by a finger and the pair of A-button 21 and B-button 22 are basically provided with the function of the + button and − button that strengthen safety by preventing mis-operation of a lever in shifting by using H-MATIC functions, such that A-button 21 corresponds to the + button and B-button 22 corresponds to the − button.

The pair of A-button 21 and B-button according to various embodiments of the present invention are provided with a function of generating operation signals to implement multitasking in various ways, such as starting of engine, safe control, and more improved convenience for the drive, in addition to the function of generating operation signals for shift-lock with the function of strengthening safety in shifting by using H-MATIC functions.

As an example of the multi-tasking, a function is to change position signals of the shift ranges by making an interval for pressing A-button 21 or B-button 22 different at a specific shift range or starts the engine by simultaneously pressing A-button 21 and B-button 22.

FIG. 4A is an exploded view of A-button 21 and B-button 22 that are assembled with button seat 15 of knob housing 11, and as shown in the figure, A-button 21 and B-button 22 are implemented by the same components.

A-button 21 includes a button body 21a with a slot 21 as at one side, a spring 21b elastically supporting button body 21a, and a switch 21c generating control signals by contacting with button body 21a.

B-button 22 includes a button body 22a with a slot 22aa at one side, a spring 22b elastically supporting button body 22a, and a switch 22c generating operation signals by contacting with button body 22a.

As shown in FIG. 4B, button body 21a of A-button 21 and button body 22a of B-button 22 are assembled, with the straight portion abutted, and guider 13 of knob housing 11 is fitted in slots 21aa and 22aa of button bodies 21a and 22a.

Switches 21c and 22c constitute an electric circuit, together with an electronic control unit (ECU) (or other suitable controller mounted in the vehicle), such that the ECU generates control signal corresponding to the signals from switches 21c and 22c, using a logic or a program stored therein.

Referring to FIG. 2, shifting operation unit 30 includes an operation dial 31 that is turned about a hinge pipe 32 to select one shift range of the P, R, N, D, and M shift ranges in accordance with the turning angle, a solenoid 33 that restricts the turn of operation dial 31 for shift lock, an operation feeling generator 35 that makes the driver feel the operation feeling at the shift range changed by turning operation dial 31, and a shift range detector that generate position signals about the information of the shift range changed by turning operation dial 31.

Hinge pipe 32 coupled to operation dial 31 is fixed to base plate 16 coupled to the bottom of knob housing 11 of mouse 10.

The shift ranges of operation dial 31 are the P, R, N, D, and M ranges and the shift ranges are sequentially implemented, such as P=>R=>N=>D=>M, with the increase in a turning angle of operation dial 31.

A plurality of position holes 31a are formed in operation dial 31 at regular intervals, coaxially with a shaft hole where hinge pipe 32 is fitted, such that a shaft 33a of solenoid 33 is fitted in position holes 31a to implement the shift lock function.

Solenoid 33 is disposed above or under operation dial 31.

In various embodiments, since various functions can be implemented by using the pair of A-button 21 and B-button 22, the number of implemented shift ranges P, R, N, D, and M and the number of position holes 31a do not agree with each other and the number of position holes 31a is relatively larger.

Figure 5:
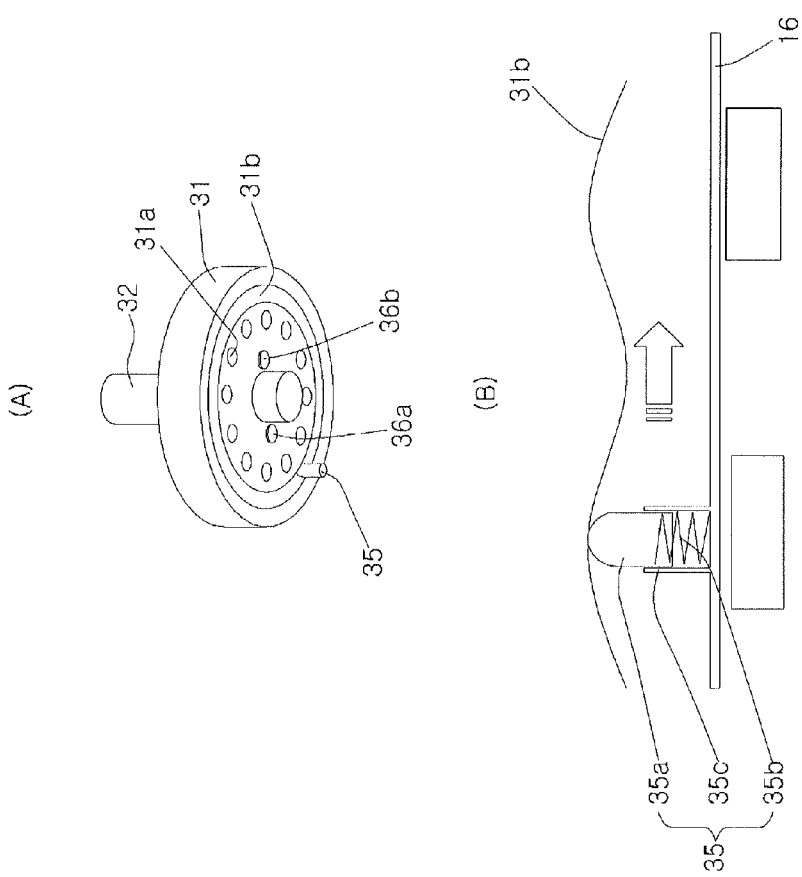

As in FIG. 5, a groove 31b is formed inward at one side of operation dial 31, coaxially outside a coaxial circle formed by position holes 31a.

Groove 31b has a trace made by repetitive smooth conical curves when expanding straight from 0° to 360°.

Therefore, assuming that the distance between the start point and the end point of one smooth conical curve of the repetitive smooth conical curves of groove 31b is one pitch, the one pitch is defined as the distance between the adjacent shift ranges P-R, R-N, N-D, and D-M.

Therefore, as operation dial 31 turns and groove 31b moves one pitch, the operator of operation dial 31 can know that the shift range is switched from the P-range to the R-range, from the movement of operation feeling generator 31 along the smooth conical curve between the start point and the end point of the pitch.

Operation feeling generator 35 includes a hollow case 35c fixed to base plate 16 and a bullet 35a elastically supported by a bullet spring 35b accommodated in case 35c.

Bullet 35a has a spherical end to minimize friction resistance with groove 31b.

The shift range detector includes a sensor circuit board fitted on hinge pipe 32 fixed to base plate 16 and magnets 36a and 36b disposed on one side of operation dial 31 to change magnetic force detected by sensor circuit board 34 in accordance with the turning angle of operation dial 31.

Magnets 36 and 36b are arranged inside the coaxial circle defined by position holes 31 of operation dial 31, at 180° from each other.

As described above, since it is possible to know the change amount in turning angle of operation dial 31 from sensor circuit board 34 detecting the magnetic force of magnets 36a and 36b, the driver can switch the shift ranges only by turning operation dial 31.

The ECU (or a controller mounted in the vehicle) constituting an electric circuit for controlling solenoid 33 also constitutes an electric circuit with sensor circuit board 34, such that the ECU generates control signals corresponding to signals from sensor circuit board 34, using the logic or program stored therein.

Display 40 is a part that displays the selected shift range and may be implemented in various ways, but is usually implemented by an image display unit, such as an LED or an LCD, and constitutes an electric circuit to display the selection with the ECU (or a controller mounted in the vehicle).

The mouse type of AT lever may implements a basic function of outputting operation signals for the positions of the selected ranges and implementing operation feeling according to the shifting, a function of preventing mis-operation in shifting by using the H-MATIC functions, a shift-lock function of preventing the ranges from being switched under a predetermined condition, a function of starting the engine by using a button, a customer-directional safety control function that is set by the customer, and an interface function for communicating with an DIS (Driver Information System) controlling the devices mounted in the vehicle.

Figure 6:
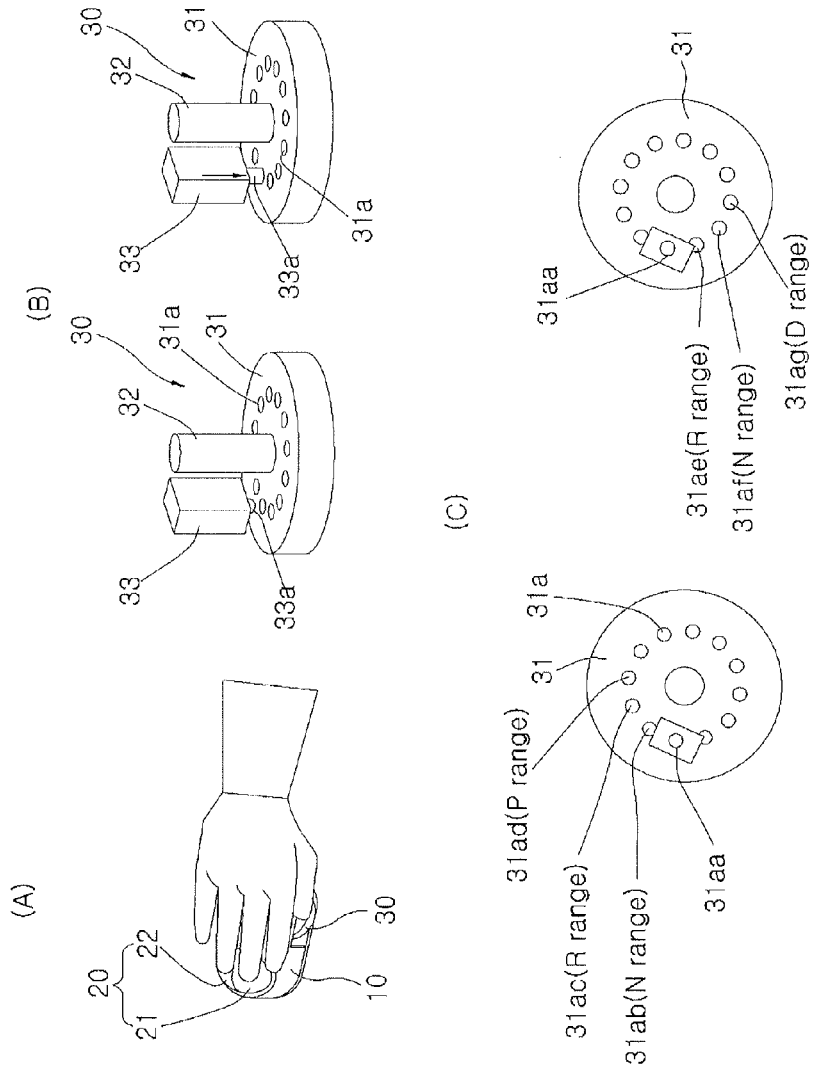
FIG. 6 is a view illustrating the operation of the exemplary AT lever mouse device according to the present invention.

The basic function implemented in various embodiments, as shown in FIG. 6A, the driver holds mouse 10 with the fingers, except the thumb, on A-button 21 and B-button 22, and turns operation dial 31 protruding from one side of mouse 10 with the thumb.

As operation dial 31 where the force from the thumb is applied is turned about hinge pipe 32 as a fixed shaft, the phases of magnets 36a and 36b on operation dial 31 change in accordance with the turning angle of operation dial 31.

Sensor circuit board 34 that does not rotate under magnets 36a and 36b detect the magnetic force of magnets 36a and 36b, such that as the phases of magnets 36a and 36b change, sensor circuit board 34 detects the magnetic force changed by the phase change and generates a signal.

When receiving the signal transmitted from sensor circuit board 34, the ECU recognizes the selected shift range from the change value of the magnetic force and generates a control signal for switching to the shift range.

As described above, since the driver toggles only with the thumb, the motion for shifting can be minimized.

Further, the operator turning operation dial 31 receives shifting feeling from operation dial 31 and the shifting feeling is provided from operation feeling generator 35 that keeps the close contact with groove 31b of operation dial 31.

As shown in FIG. 5, as operation dial 31 is turned and groove 31b moves one pitch, movement is generated in operation feeling generator 35, along the smooth conical curve with one pitch from the start point to the end point.

The movement of operation feeling generator 35 is implemented by bullet 35a elastically supported by bullet spring 35b.

That is, bullet 35a presses down bullet spring 35 at the peak of the smooth conical curve and moves up at the opposite position by the elastic restoring force of bullet spring 35b.

In this process, operation dial 31 receives the up-down movement of bullet 35a elastically supported by bullet spring 35b and the up-down movement is transmitted to the thumb that is in contact with operation dial 31, such that the operator can know the change of the shift ranges (P-range→R-range) due to the rotation of operation dial 31 from the shifting feel.

In various embodiments, since the function of preventing mis-operation in shifting by using H-MATIC functions is implemented only when operation dial 31 is at the M-range, operation dial 31 is maximally turned to the M-range, before the function is implemented by the pair of A-button 21 and B-button 22.

This is because the position of the shift range defined by operation dial 31 sequentially changes in the order of P=>R=>N=>D=>M in accordance with the increases in turning angle of operation dial 31.

Figure 4:
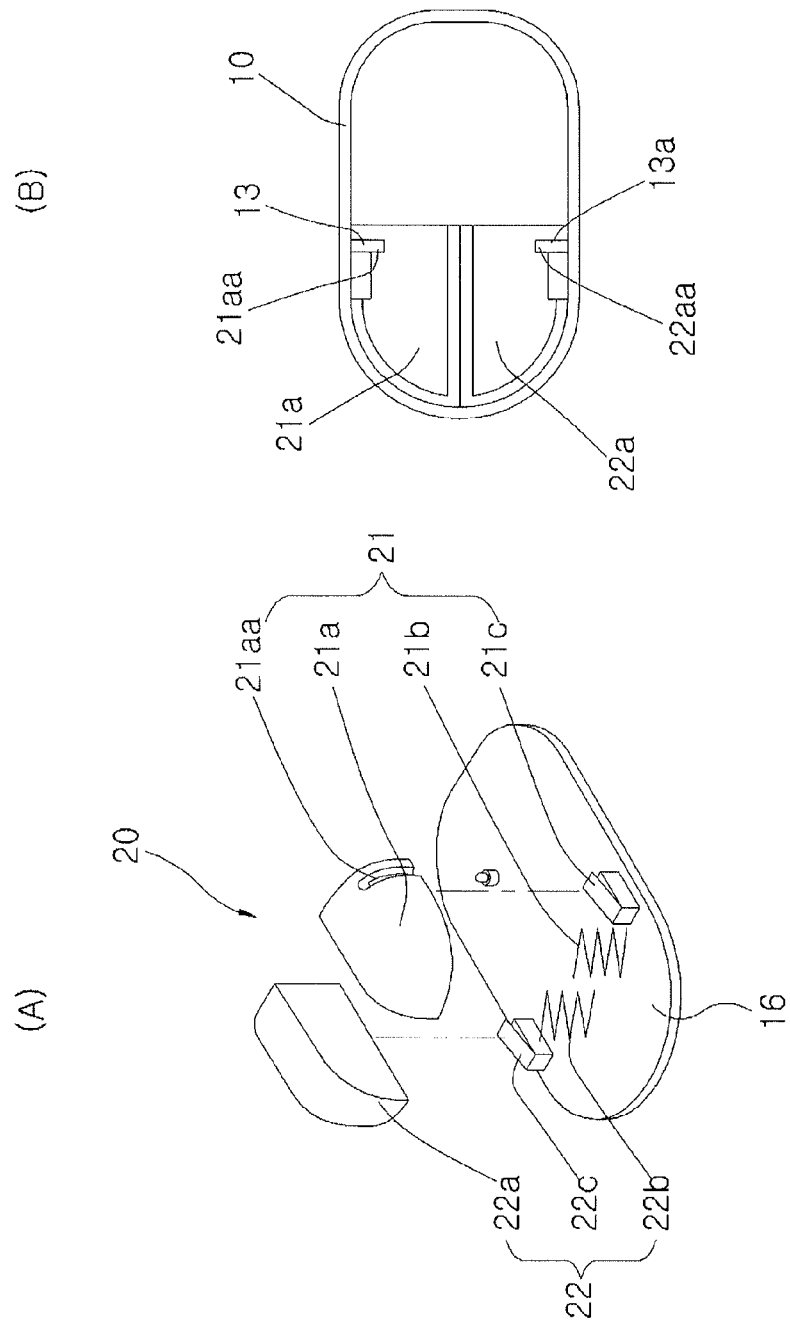

As shown in FIG. 4, A-button 21 and B-button 22 have button bodies 21a and 22a coupled to guider 13 of knob housing 11 by slots 21aa and 22aa, respectively, such that when the pair of A-button 21 and B-button 22 are pressed together, with operation dial 31 turned to the M-range, guide 13 keep the movement of A-button 21 and B-button 22 stable.

As button bodies 21a and 22a pressed by the finger moves down to be in contact with switches 21c and 22c while compressing springs 21b and 22b, switches 21c and 22c generate electric signals in response to the contact, and when the ECU recognizes the signals, the ECU implements a state where the shifting control by using H-MATIC functions is possible.

As described above, since the signals from A-button 21 and B-button 22 are recognized only as the M-range mode, not at the ranges of P, R, N, and D, mis-operation is prevented in the shifting by using H-MATIC functions, thus considerably strengthening safety.

Further, unlike the way of necessarily moving the entire arm back in the related art, the shifting by using H-MATIC functions is conveniently implemented only operating A-button 21 and B-button by pressing them with fingers.

The shift-lock function implemented in various embodiments prevents operation dial 31 from turning against the driver's intention when the driver operates operation dial 31 at the P-range without pressing down the brake pedal, or the driver operates operation dial 31 from the N-range to the R-range without pressing down the brake pedal.

On the contrary, since the shift-lock is not performed when a signal of the brake pedal is input to the ECU, the driver can freely turn operation dial 31.

The left one in FIG. 6B shows when the shift-lock is not implemented, in which power is supplied to solenoid 33 and shaft 33a of the solenoid does not come out.

However, the right one in FIG. 6B shows when the shift-lock is implemented, in which power is not supplied to solenoid 33 and shaft 33a of the solenoid come out.

As described above, as shaft 33a of the solenoid comes out and moves down to be fitted in position hole 31a, operation dial 31 with position hole 31a is switched to be restricted by solenoid 33, such that operation dial 31 does not turn even if being turned by external force.

According to the function of starting the engine by using the button implemented in various embodiments, when a simple operation of simultaneously pressing the pair of A-button 21 and B-button 22 for one to three or more seconds, with the brake pedal pressed down, is performed, signals generated from A-button 21 and B-button 22 are transmitted to the ECU and the ECU starts the engine by transmitting the control signals.

As described above, since it is possible to start the engine by pressing the pair of A-button 21 and B-button 22 with two fingers, it is possible to achieve convenient operation without using a specific start button for starting the engine, as in the related art.

The customer-directional safe control function that is defined by the customer, implemented in various embodiments, uses the amount of time for which A-button 21 or B-button 22 is pressed by the fingers, such that it is possible to implement various functions by variously changing the time for which A-button 21 or B-button 22 is pressed.

As the functions, logics of switching to the P-range when A-button 21 is pressed for three or more seconds at the D-range, switching to the N-range when B-button 22 is pressed for three or more second at the D-range, or stopping the engine when A-button 21 and B-button 22 are pressed for five or more seconds at the N-range may be exemplified.

Even if the P, R, N, D, and M shift ranges are implemented by operation dial 31 in accordance with the various functions, a larger number of position holes 31a than the number of shift ranges P, R, N, D, and M, which are implemented as shown in FIG. 6D, are formed in operation dial 31.

FIG. 6C shows when A-button 21 is pressed for three or more seconds at the D-range to implement the P-range.

As shown in the figure, it can be seen from the figure at the left side that some position holes 31aa, 31ab, 31ac, and 31ad of position holes 31a sequentially correspond to the order or N-range 31ab→R-range 31ac→P-range 31ad, clockwise from D-range 31aa.

On the contrary, it can be seen from the figure at the right side that some other position holes 31aa, 31ae, 31af, and 31ag of position holes 31a sequentially correspond to the order or R-range 31ae→N-range 31af→D-range 31ag, counterclockwise from P-range 31aa.

As described above, even if operation dial 31 is at any rotation state, as long as the operation dial can be operated to correspond to the arrangement of shift ranges P, R, N, D, and M, which are switched by some of position holes 31a, solenoid 31 can be accurately fitted in position hole 31a, regardless of the rotation positions of operation dial 31, such that shift-lock with reliability can be provided.

The interface function implemented in various embodiments allows the driver to feel the same convenience as operating the computer mouse, by making it possible to communicate with a DIS (Driver Information System) controlling related parts, such as a navigation device or an audio mounted in the vehicle.

For this configuration, a control logic is implemented such that the signals generated when A-button 21 and B-button 22 are pressed select and release a menu of the device to control, and the signals generated in accordance with the turning angles of operation dial 31 moves the menu.

Therefore, the driver can feel convenience in that it is possible to operate desired devices by lightly pressing A-button 21 and B-button with the fingers and select and execute a menu by turning operation dial 31 with the thumb, in a safe stop state, such as the P-range and the N-range.

For convenience in explanation and accurate definition in the appended claims, the terms front and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An auto transmission (AT) lever mouse device for a shift by wire system, comprising:
    a mouse shaped to be operable by fingers while being held by a hand;
    an A-button and a B-button disposed at the mouse and generating and transmitting to a control unit operation signals generated when being pressed by the fingers; and
    a shifting operation unit disposed at the mouse and transmitting to the control unit shift range position signals generated when being turned by the fingers,
    wherein the shifting operation unit includes:
        an operation dial for determining selected positions of the shift ranges in the shift ran m made about a hinge pipe;
        a solenoid restricting the rotation of the operation dial;
        an operation feeling generator transmitting operation feeling from the shift ranges switched by the rotation of the operation dial; and
        a shift range detector generating position signals about information on the selected shift ranges by the rotation of the operation dial, and
    wherein the operation feeling generator has a groove coaxially formed with a shaft hole for fitting the hinge pipe in the operation dial, and a bullet elastically supported by a bullet spring and keeping in contact with a surface of the groove.

2. The device as defined in claim 1, further comprising a display that displays shifted states of the shift ranges, on the mouse.

3. The device as defined in claim 2, wherein the display is an image display unit, such as an LED or an LCD.

4. The device as defined in claim 1, wherein the mouse includes a knob housing having a shape similar to a computer mouse, with an empty internal space and an open bottom, and a base plate shaped in a flat plate and coupled to the open bottom of the knob housing.

5. The device as defined in claim 4, wherein the knob housing has a side opening formed by cutting off a portion of the frame forming one side of the knob housing such that a portion of the shifting operation unit is exposed to be operated by a finger, and a button seat formed by cutting off a portion of the frame from a top to a front of the knob housing such that the pair of A-button and B-button, which are pressed with the fingers, are seated.

6. The device as defined in claim 5, wherein a guide vertically protrudes from an inner wall, in the internal space of the knob housing, toward the internal space.

7. The device as defined in claim 1, wherein the A-button and B-button generate different operation signals, which are recognized by the control unit, in accordance with a degree of pressing such that various control logics of the control unit is selectively executed.

8. The device as defined in claim 7, wherein the A-button and B-button each include a button body, which has a slot fitted on a guider protruding in the internal space of the knob housing of the mouse, at one side; a spring elastically supporting the button body; and a switch generating the operation signal by contacting with the button body.

9. The device as defined in claim 1, wherein a solenoid shaft of the solenoid is fitted in a position hole bored coaxially with a shaft hole for fitting the hinge pipe in the operation dial.

10. The device as defined in claim 9, wherein a number of position holes is not the same as a number of shift ranges implemented by rotation of the operation dial.

11. The device as defined in claim 10, wherein the number of position holes is larger than the number of shift ranges implemented by rotation of the operation dial.

12. The device as defined in claim 1, wherein the groove has a trace made by repetitive smooth conical curves when expanding straight from 0° to 360°, and when a distance between a start point and an end point of one smooth conical curve is one pitch, the one pitch is defined as a distance between adjacent shift ranges.

13. The device as defined in claim 12, wherein the bullet has a spherical end that is in contact with the groove.

14. The device as defined in claim 13, wherein the bullet is accommodated in a hollow case fixed to a base plate of the mouse and elastically supported by the bullet spring.

15. An auto transmission (AT) lever mouse device for a shift by wire system, comprising:
    a mouse shaped to be operable by fingers while being held by a hand;
    an A-button and a B-button disposed at the mouse and generating and transmitting to a control unit operation signals generated when being pressed by the fingers; and
    a shifting operation unit disposed at the mouse and transmitting to the control unit shift range position signals generated when being turned by the fingers,
    wherein the shifting operation unit includes:
        an operation dial for determining selected positions of shift ranges in the shift ranges implemented at turning angles made about a hinge pipe;
        a solenoid restricting a rotation of the operation dial;
        an operation feeling generator transmitting operation feeling from the shift ranges switched by the rotation of the operation dial; and
        a shift range detector generating position signals about information on the selected shift ranges by the rotation of the operation dial, and
    wherein the shift range detector includes at least one or more magnets disposed at the operation dial and rotating with the operation dial, and a sensor circuit board detecting different magnitude of magnetic force from the magnets by a phase difference due to rotation of the magnets, and transmitting signals according to the magnitude of the detected magnetic force to the control unit.

16. The device as defined in claim 15, wherein the magnets are two magnets disposed inside a coaxial circle defined by position holes of the operation dial and arranged at 180° from each other.

* * * * *